(12) United States Patent
Kato (10) Patent No.: US 6,201,904 B1
(45) Date of Patent: Mar. 13, 2001

(54) OPTICAL DEMULTIPLEX CIRCUIT

(75) Inventor: Hiroyuki Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/492,842

(22) Filed: Jan. 27, 2000

(30) Foreign Application Priority Data

Jan. 27, 1999 (JP) ................................................ 11-019167

(51) Int. Cl.$^7$ .................................................... G02B 6/26
(52) U.S. Cl. ................................................................ 385/15
(58) Field of Search ................................ 385/15, 33, 24; 359/341, 130, 125

(56) References Cited

U.S. PATENT DOCUMENTS

| | | | |
|---|---|---|---|
| 5,555,118 | * | 9/1996 | Huber ..................................... 359/125 |
| 5,579,143 | * | 11/1996 | Huber ..................................... 359/130 |
| 5,706,375 | * | 1/1998 | Mihailov et al. ....................... 385/24 |
| 5,754,718 | * | 5/1998 | Duck et al. ............................. 385/33 |
| 5,812,306 | * | 9/1998 | Mizrahi ................................ 359/341 |

\* cited by examiner

*Primary Examiner*—Akm E. Ullah
(74) *Attorney, Agent, or Firm*—McGinn & Gibb, PLLC (57) ABSTRACT

An optical demultiplex circuit includes an optical circulator, a chirped fiber grating, and a fiber Bragg grating. The optical circulator has a first port for receiving an optical signal, a second port for outputting the optical signal input to the first port, and a third port for outputting the optical signal input to the second port. The chirped fiber grating selectively reflects optical signals output from the second port and outputs them to the second port. The chirped fiber grating has a wide reflection wavelength band and side lobes. The fiber Bragg grating is inserted between the second port and the chirped fiber grating and reflects, of the optical signals output from the second port, only optical signals in a narrow wavelength band corresponding to the side lobes of the chirped fiber grating.

8 Claims, 7 Drawing Sheets

OPTICAL DEMULTIPLEX CIRCUIT

BACKGROUND OF THE INVENTION

The present invention relates to an optical demultiplex circuit for demultiplexing signal light multiplexed at a small wavelength interval.

In a narrow-band multiwavelength multiplex transmission system that constructs a large-capacity transmission system, an optical demultiplex circuit for demultiplexing signal light multiplexed at a small wavelength interval is essential. Such an optical demultiplex circuit is formed by combining an AWG (Arrayed Waveguide Grating), dielectric multilayered filter, fiber Bragg grating, chirped fiber grating, and optical circulator.

However, an AWG is generally expensive, has a large insertion loss of about 6 dB, and requires a temperature control circuit. A dielectric multilayered filter or a chirped fiber grating has large side lobes and, generally, dependency on temperature. In addition, when an optical circulator and a fiber Bragg grating are combined, the arrangement for demultiplexing a number of wavelengths becomes complex.

Furthermore, in use of an output from a pumping laser source used for an optical amplifier using a fiber doped with rare earth elements, the upper limit of the number of wavelengths is about 30 to obtain a gain of 25 dB. To solve this problem, polarized wave synthesis or wavelength multiplex of the pumping laser source, and use of a solid-state laser source have been proposed. However, these methods make the apparatus very expensive and bulky.

SUMMARY OF THE INVENTION

It is an object of the present invention to provide an optical demultiplex circuit that solves the temperature dependency of demultiplexed wavelengths used in a narrow-band multiwavelength multiplex transmission system.

In order to achieve the above object, according to the present invention, there is provided an optical demultiplex circuit comprising an optical circulator having a first port for receiving an optical signal, a second port for outputting the optical signal input to the first port, and a third port for outputting the optical signal input to the second port, first reflection means for selectively reflecting optical signals output from the second port and outputting the optical signals to the second port, the first reflection means having a wide reflection wavelength band and side lobes, and second reflection means, inserted between the second port and the first light reflection means, for reflecting, of the optical signals output from the second port, only optical signals in a narrow wavelength band corresponding to the side lobes of the first light reflection means.

DESCRIPTION OF THE PREFERRED EMBODIMENTS

The present invention will be described below in detail with reference to the accompanying drawings.

Figure 1:
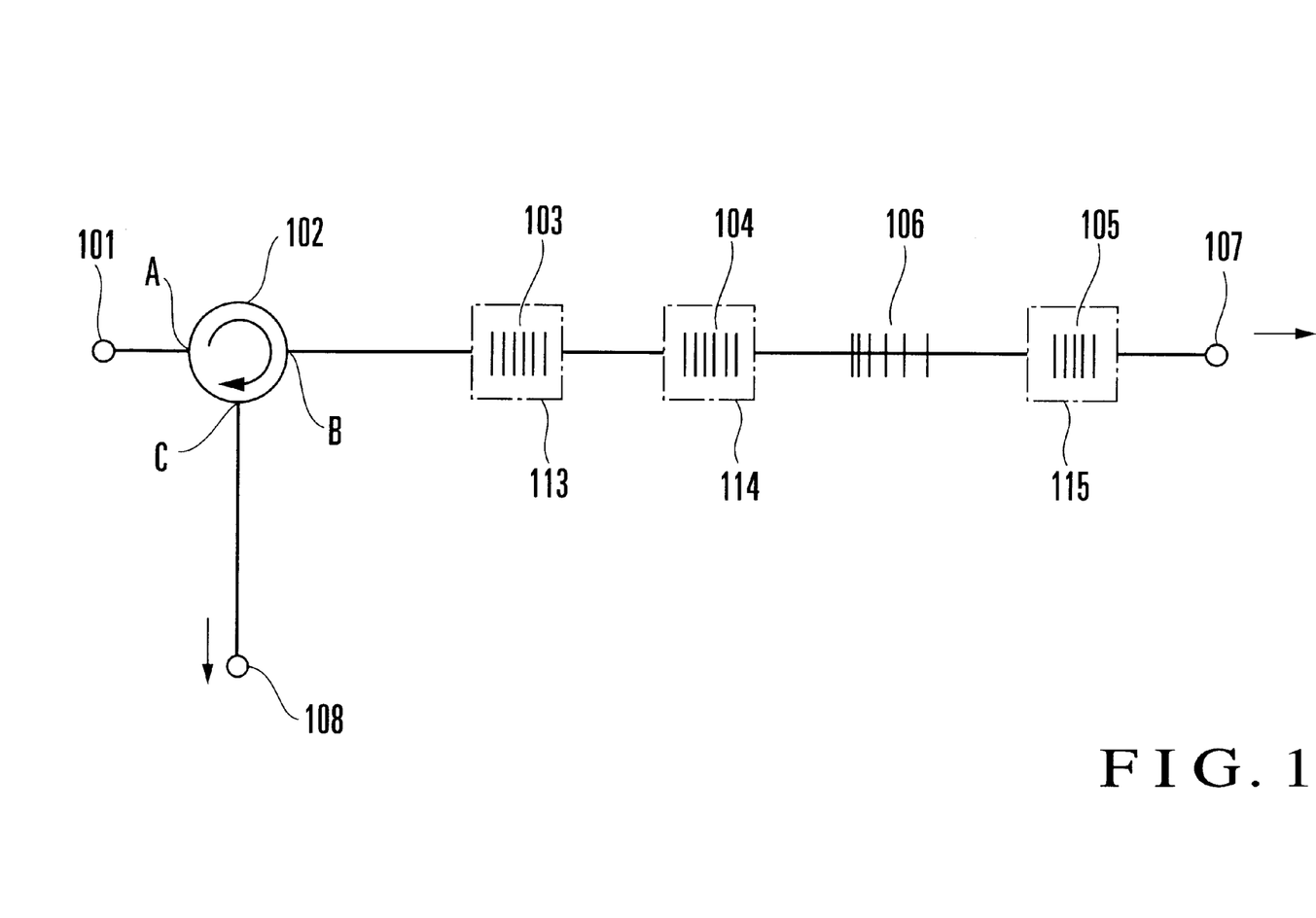
FIG. 1 is a view showing the arrangement of an optical demultiplex circuit according to the first embodiment of the resent invention.

FIG. 1 shows the arrangement of an optical demultiplex circuit according to the first embodiment of the present invention.

The optical demultiplex circuit shown in FIG. 1 is constructed by a 3-terminal optical circulator (to be referred to as an optical circulator hereinafter) 102 for outputting signal light input to a first port A to a second port B, and signal light input to the second port B to a third port C, fiber Bragg gratings 103, 104, and 105 each of which has reflection wavelength characteristics in the narrow band and reflects only signal light having a specific wavelength, and a chirped fiber grating 106 serving as a wavelength selective optical reflector having a reflection wavelength band wider than that of the fiber Bragg gratings 103, 104, and 105.

The fiber Bragg gratings 103 and 104, chirped fiber grating 106, and fiber Bragg grating 105 are cascade-connected to the second port B of the optical circulator 102 in the order named.

Of signal light incident through the first port A, optical circulator 102, and second port B, a signal light component that has passed through the fiber Bragg gratings 103, 104, and 105, and chirped fiber grating 106 is output from an exit port 107. On the other hand, a signal light component reflected by the fiber Bragg gratings 103, 104, and 105, and chirped fiber grating 106 is output from an exit port 108 through the second port B, optical circulator 102, and third port C.

That is, the optical circulator 102 functions to couple signal light reflected by the fiber Bragg gratings 103, 104, and 105, and chirped fiber grating 106 to the exit port 108. An optical fiber as an optical transmission path is connected to the first port of the optical circulator 102 which receives signal light from an input port 101.

The fiber Bragg gratings 103, 104, and 105 are optical components each of which reflects light having a specific wavelength, and have reflection wavelengths of 1550.116 nm, 1550.517 nm, and 1550.918 nm, respectively. The chirped fiber grating 106 is an optical component for reflecting light in a wider band as compared to the fiber Bragg gratings 103, 104, and 105 and has a reflection wavelength band of 1536 to 1550.2 nm at ambient temperature of 25° C.

The fiber Bragg gratings 103, 104, and 105 are mounted in temperature compensation packages 113, 114, and 115 for preventing the reflection wavelengths from varying due to the ambient temperature, respectively. The temperature compensation packages 113, 114, and 115 can be realized by combining materials, e.g., aluminum and silica having different linear expansion coefficients and managing the tension applied to the grating portion.

The chirped fiber grating 106 is longer than the fiber Bragg gratings 103, 104, and 105, and therefore, it is very difficult to mount the chirped fiber grating 106 in a temperature compensation package for managing the tension. The reflection wavelength band of the chirped fiber grating 106 is widened to a range shorter by the temperature shift amount than the signal light wavelength of ch1.

The operation of the optical demultiplex circuit having this arrangement will be described while exemplifying an application to a 64-wave multiplex transmission system having channel (ch) 1 to channel (ch) 64 at a wavelength interval of 0.8 nm.

Figure 2:
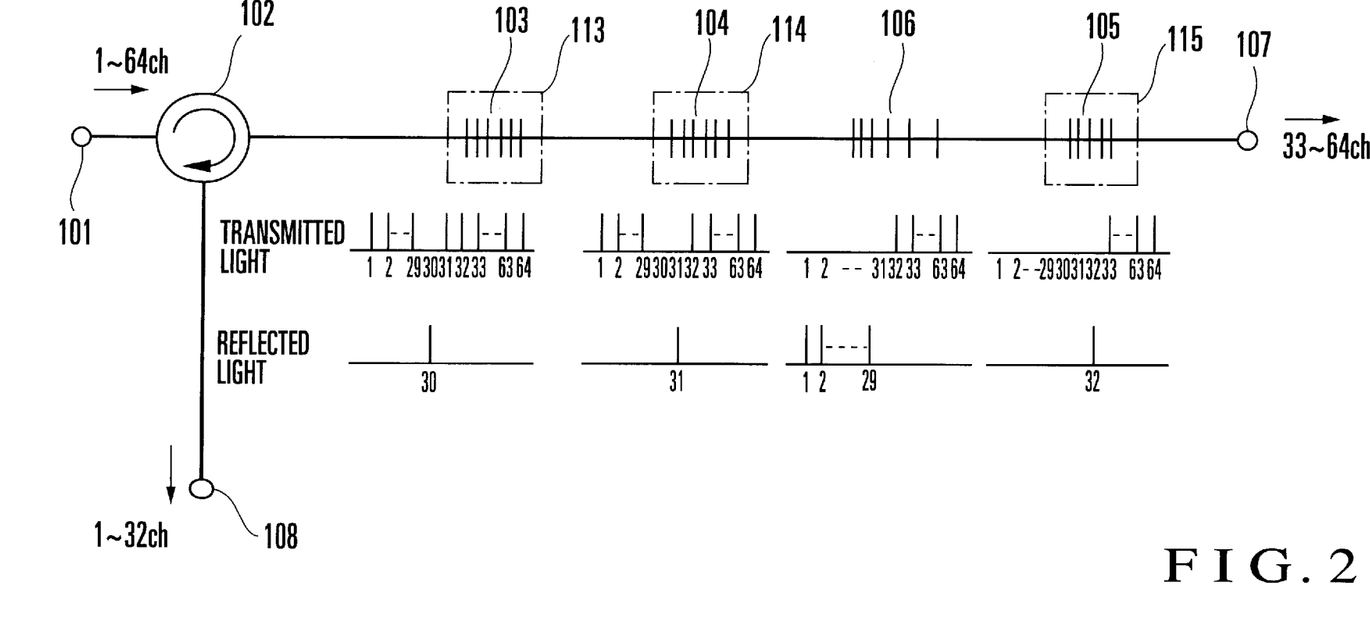
FIG. 2 is a view for explaining the signal light demultiplex operation of a 64-wave multiplex transmission system in the optical demultiplex circuit shown in FIG. 1.

Of signal light components of ch1 to ch64 input from the input port 101 and passing through the optical circulator 102, signal light components of ch30 and ch31 are reflected by the fiber Bragg gratings 103 and 104, respectively, as shown in FIG. 2. The signal light components of ch1 to ch29 are reflected by the chirped fiber grating 106, and the signal light component of ch32 is reflected by the fiber Bragg grating 105. The signal light components of ch33 to ch64 which are not reflected by the fiber Bragg gratings 103, 104, and 105 and chirped fiber grating 106 are directly output to the exit port 107.

The signal light components of ch1 to ch32 reflected by the fiber Bragg gratings 103, 104, and 105 and chirped fiber grating 106 are output to the exit port 108 through the optical circulator 102 again. In this way, signal light components multiplexed at an interval of 0.8 nm can be demultiplexed.

Details of the above-described optical demultiplex circuit will be described next.

Figure 3:
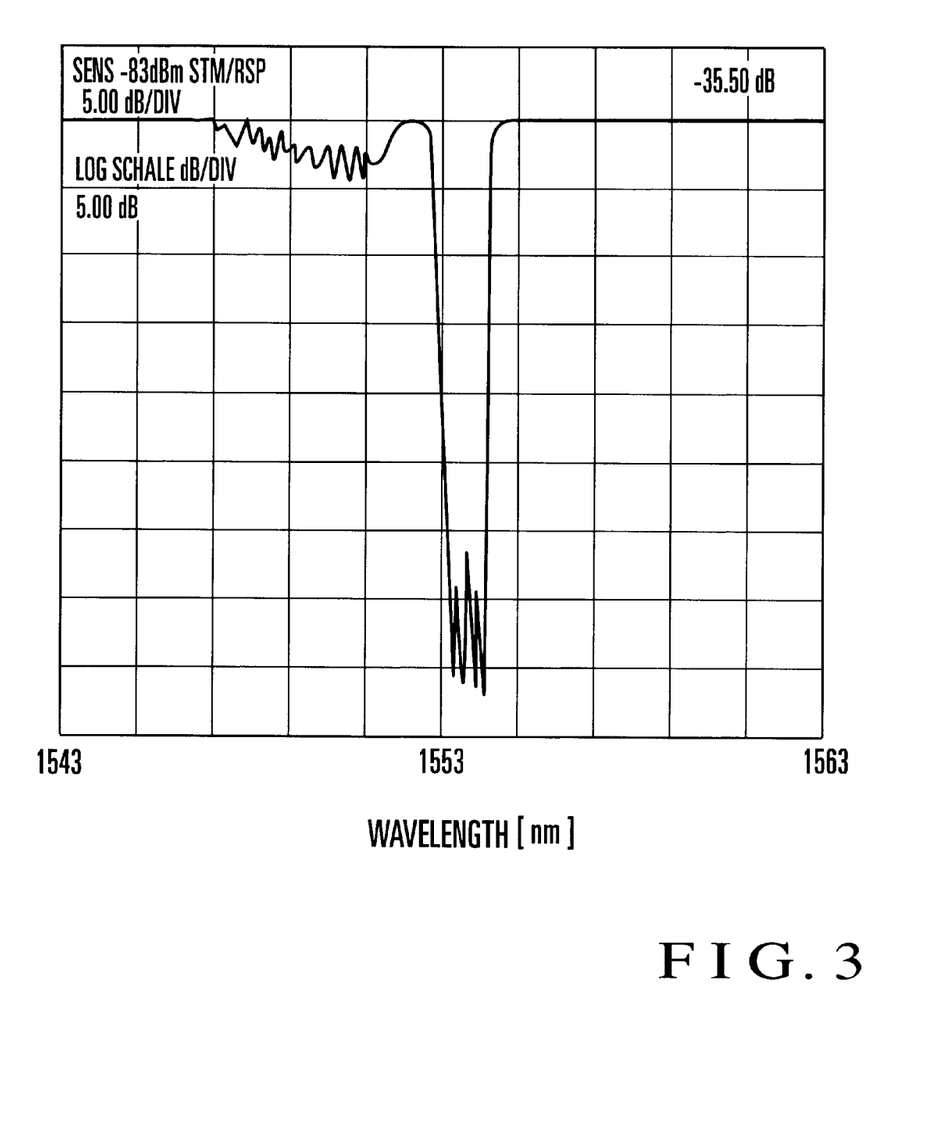
FIG. 3 is a graph showing the reflection wavelength band of a chirped fiber grating shown in FIG. 1.

The fiber Bragg gratings 103, 104, and 105 and chirped fiber grating 106 generate a loss on the short wavelength side of the reflection wavelength due to coupling to the radiation mode, as shown in FIG. 3. For this reason, in a general optical demultiplex circuit, to prevent any influence of the loss due to coupling to the radiation mode on other signal light components, the fiber Bragg gratings 103, 104, and 105 and chirped fiber grating 106 are preferably arranged such that short-wavelength light components are sequentially reflected from the incident side.

Figure 4:
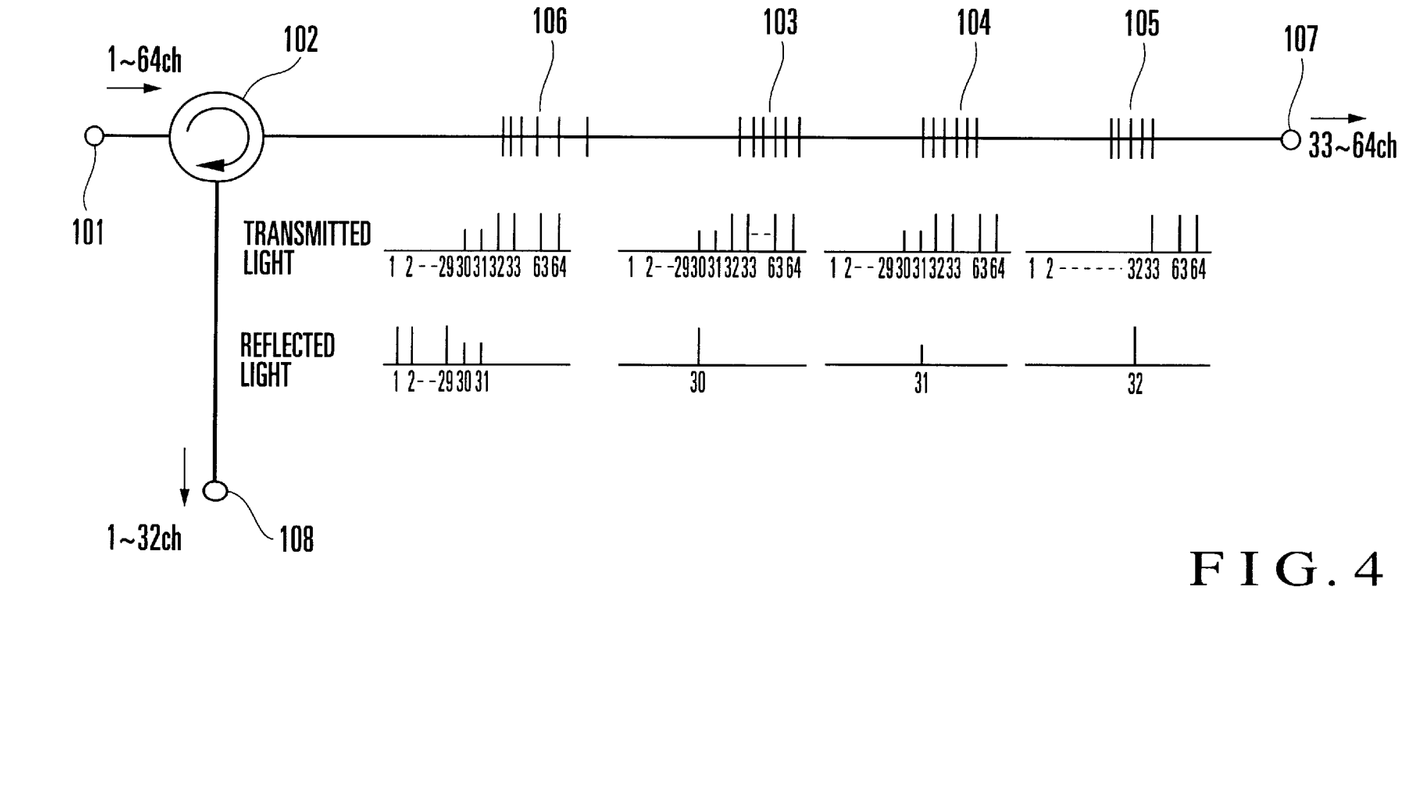
FIG. 4 is a view showing a comparative example of an optical demultiplex circuit in which the order of the fiber Bragg gratings and chirped fiber grating is changed.

FIG. 4 shows a comparative example of an optical demultiplex circuit in which the fiber Bragg gratings 103, 104, and 105 and chirped fiber grating 106 are arranged such that short-wavelength light components are sequentially reflected from the incident side. In the optical demultiplex circuit shown in FIG. 4, the chirped fiber grating 106 is connected to the port of the optical circulator 102 on the exit port 107 side, and the fiber Bragg gratings 103, 104, and 105 are sequentially connected to the output side of the chirped fiber grating 106.

The operation of the optical demultiplex circuit having this arrangement (comparative example) will be described while exemplifying an application to a 64-wave multiplex system.

Of signal light components of ch1 to ch64 incident from the input port 101 and passing through the optical circulator 102, the signal light components of ch1 to ch29 are reflected by the chirped fiber grating 106. However, since the chirped fiber grating 106 has side lobes on both sides of the grating lobe, the signal light components of ch30 and ch31 partially pass through the chirped fiber grating 106 and are partially reflected by the chirped fiber grating 106.

The signal light components of ch30 and ch31 passing through the chirped fiber grating 106 are reflected by the fiber Bragg gratings 103 and 104. Some of the signal light components are reflected by the chirped fiber grating 106 again and return to the fiber Bragg gratings 103 and 104, resulting in multiple reflection.

Figure 5A:
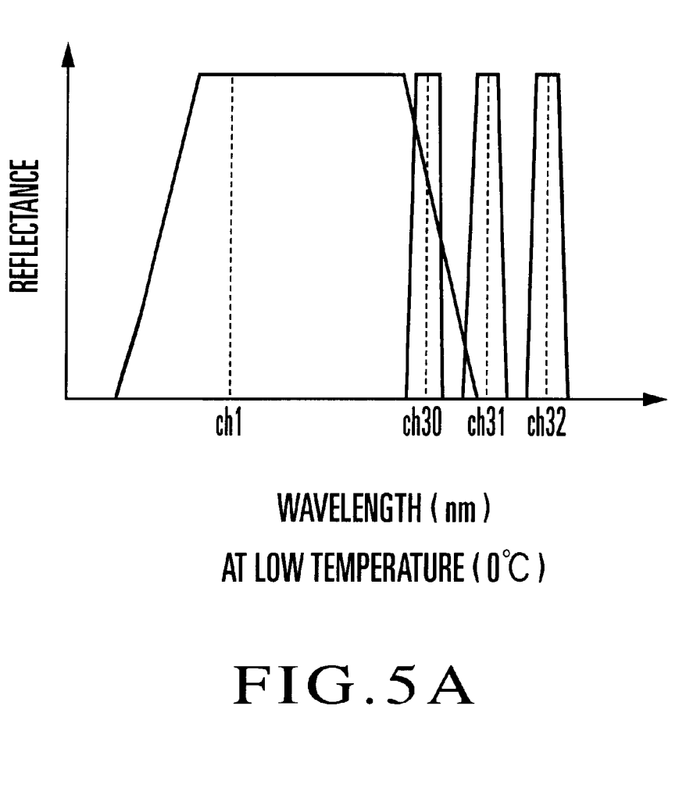
FIGS. 5A and 5B are graphs showing the reflection wavelength bands of the chirped fiber grating in low and high temperature states.
Figure 5B:
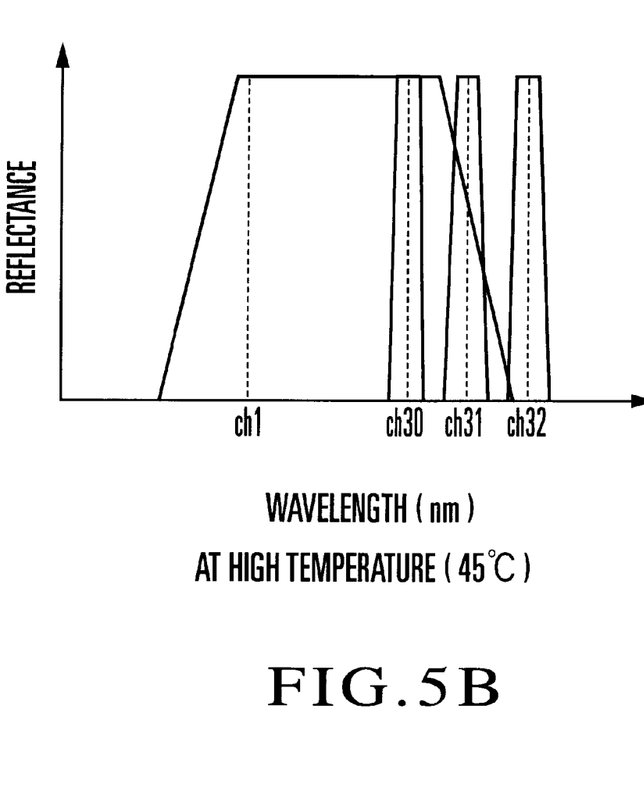

When the reflected light band of the chirped fiber grating 106 is widened, the side lobes of reflected light become hard to suppress. As shown in FIGS. 5A and 5B, the two ends of the reflection band of the chirped fiber grating 106 have more moderate tilts than those of the fiber Bragg gratings 103, 104, and 105. For this reason, when the chirped fiber grating 106 having a wider reflected light band is used, it is very difficult to extract (select) signal light components at a wavelength interval as small as about 0.8 nm.

To avoid this disadvantage, wavelengths corresponding to the side lobes of the chirped fiber grating 106 must be reflected in advance.

Due to this reason, in the first embodiment, the fiber Bragg gratings 103 and 104 which reflect light components having wavelengths of ch30 and ch31 corresponding to the side lobes of the chirped fiber grating are arranged on the front side (input side) of the chirped fiber grating 106.

A measure against a change in ambient temperature in the first embodiment will be described next.

The chirped fiber grating 106 has a temperature dependency of about 0.012 nm/° C. in the reflection wavelength. As describe above, it is difficult to mount the chirped fiber grating 106 in a temperature compensation package. For this reason, when the ambient temperature changes by 40° C., the reflection wavelength shifts by 0.48 nm. In this case, the side lobe of the chirped fiber grating 106 undesirably overlaps the signal light wavelength of the adjacent channel.

To prevent this disadvantage, in the optical demultiplex circuit shown in FIG. 1, the fiber Bragg gratings 103 and 104 mounted in the temperature compensation packages 113 and 114 for preventing the reflection wavelengths from changing due to the ambient temperature are arranged on the input side of the chirped fiber grating 106 to reflect signal light components having wavelengths corresponding to the side lobes of the chirped fiber grating 106 in advance. Hence, the influence of a change in reflection wavelength due to a change in ambient temperature of the chirped fiber grating 106 can be eliminated.

A case wherein the optical demultiplex circuit shown in FIG. 1 is operated at an ambient temperature of 45° C. will be described next.

Of incident signal light components of ch1 to ch64, the signal light components of ch30 and ch31 are reflected by the fiber Bragg gratings 103 and 104, respectively. This is because the fiber Bragg gratings 103 and 104 are mounted in the temperature compensation packages 113 and 114 and do not depend on the ambient temperature. That is, the temperature compensation packages 113 to 115 form the temperature compensation fiber Bragg gratings 103 to 105.

At 45° C., the reflection wavelength of the chirped fiber grating 106 shifts to the long wavelength side by about 0.5 nm as compared to that at 0° C., as shown in FIGS. 5A and 5B. In this embodiment, since the reflection wavelength band of the chirped fiber grating 106 is widened to a range shorter by the temperature shift amount than the signal light wavelength of ch1, the signal light components of ch1 to ch29 can be reflected even at 45° C. Accordingly, the long-wavelength-side end of the chirped fiber grating 106 also shifts by about 0.5 nm as compared to that at 0° C. However, since it does not overlap the signal light wavelength of ch32, no multiple reflection between the chirped fiber grating 106 and the fiber Bragg gratings occur.

According to this embodiment, by reflecting a wavelength band corresponding to the side lobes of the chirped fiber grating 106, a demultiplex circuit for demultiplexing a wavelength-multiplexed transmission signal multiplexed at a small wavelength interval can be constructed.

In addition, since the chirped fiber grating 106 for which temperature compensation is difficult is combined with the temperature compensation fiber Bragg gratings 103, 104, and 105, a wavelength demultiplex circuit without any dependency on temperature can be constructed.

Figure 6:
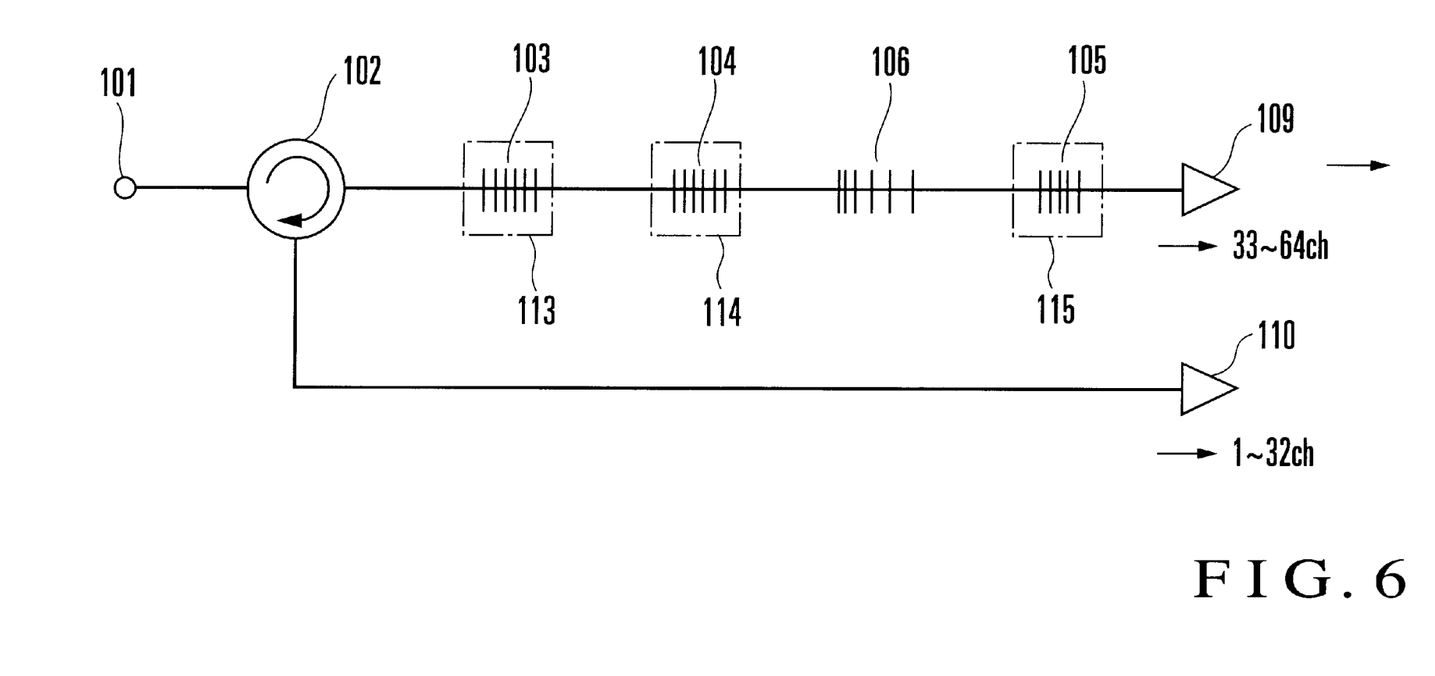
FIG. 6 is a view showing an example in which the optical demultiplex circuit shown in FIG. 1 is applied to an optical amplifier.

The above-described embodiment can be applied to an optical amplification circuit shown in FIG. 6. In this optical amplification circuit, optical amplifiers 109 and 110 using a fiber doped with rare earth elements are connected to the positions of the exit ports 107 and 108 shown in FIG. 1. The optical amplifier 109 amplifies optical signals of ch33 to ch64, and the optical amplifier 110 amplifies optical signals of ch1 to ch32. For the optical amplifiers 109 and 110 using a fiber doped with rare earth elements, the output from the obtained pumping laser source is not so large. For this reason, only about 30 wavelengths can be amplified to obtain a gain of 25 dB.

However, when the above-described optical demultiplex circuit is used, an arbitrary number of signal light components can be demultiplexed from signal light components multiplexed at a small wavelength interval. For this reason, after a number of signal light components with which a sufficient gain can be ensured are demultiplexed, optical amplification can be performed. Hence, wavelength-multiplexed transmission light with a number of wavelengths can be amplified without using any special optical amplifier.

Figure 7:
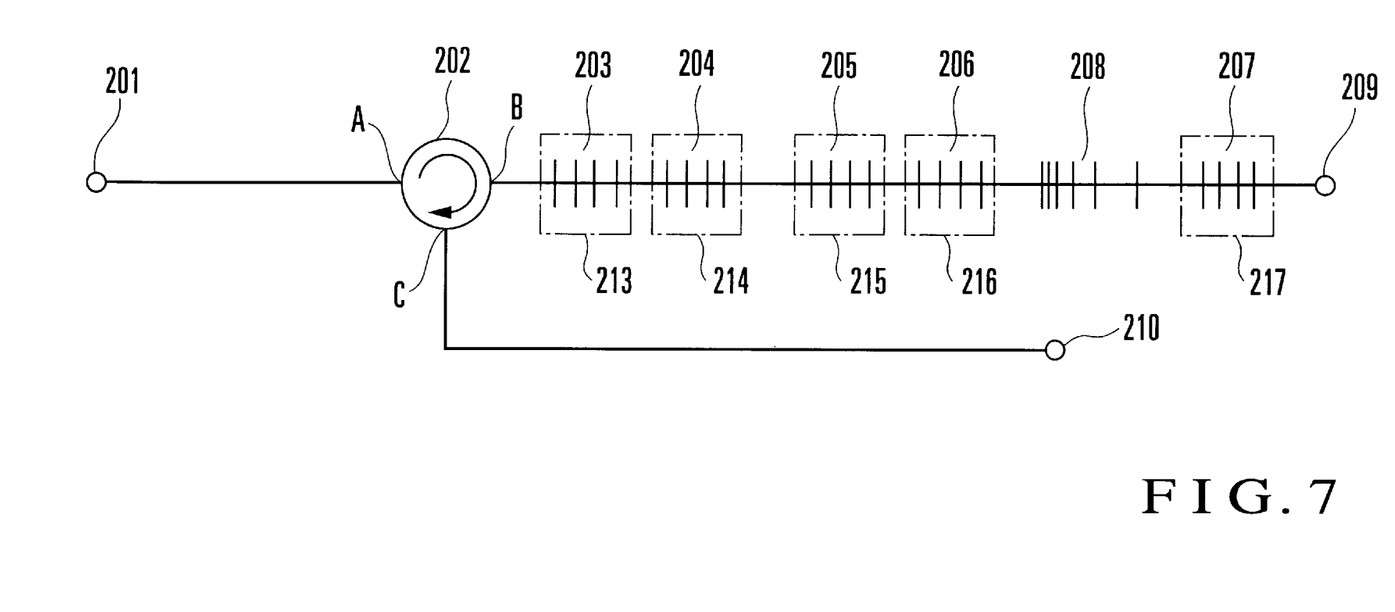
FIG. 7 is a view showing an optical demultiplex circuit according to the second embodiment of the present invention.

FIG. 7 shows the arrangement of an optical demultiplex circuit according to the second embodiment of the present invention.

In the optical demultiplex circuit shown in FIG. 7, fiber Bragg gratings 203, 204, 205, and 206, chirped fiber grating 208, and fiber Bragg grating 207 are sequentially connected to the second port of a 3-terminal optical circulator 202 having a first port A connected to an input port 201. An exit port 209 is connected to the output side of the fiber Bragg grating 207.

The fiber Bragg gratings 203 to 207 have reflection wavelengths of 1553.329 nm, 1554.940 nm, 1555.747 nm, 1556.555 nm, and 1557.363 nm, respectively. The chirped fiber grating 208 has a reflection wavelength band of 1538.876 to 1553.329 nm at 25° C.

The fiber Bragg gratings 203 to 207 are mounted in temperature compensation packages 213 to 217 for preventing the reflection wavelengths from varying due to the ambient temperature, respectively. That is, the temperature compensation packages 213 to 217 form the temperature compensation fiber Bragg gratings 203 to 207.

The optical demultiplex circuit of this embodiment is effective when the side lobes are larger than those of the chirped fiber grating 106 used in the first embodiment. More specifically, the four fiber Bragg gratings 203 to 206 are arranged on the input side of the chirped fiber grating 208 to reflect signal light components corresponding to the side lobes of the chirped fiber grating 208. Hence, no multiple reflection occurs due to the side lobes of the chirped fiber grating 208.

As in the first embodiment, when optical amplifiers are connected to the output side of the fiber Bragg grating 207 and a third port C of the optical circulator 202, an optical amplification circuit for amplifying wavelength-multiplexed transmission light with a number of wavelengths can be constructed without using any special optical amplifier.

The number of fiber Bragg gratings arranged on the input side of the chirped fiber grating is not limited to two or four. One or more fiber Bragg gratings suffice depending on the magnitude of the side lobe of the chirped fiber grating.

As is apparent from the above description, according to the present invention, a plurality of fiber Bragg gratings are arranged on the input side of the chirped fiber grating having wide-band reflection wavelength characteristics to reflect a wavelength band corresponding to the side lobes of the chirped fiber grating. Even when the band of reflected light of the chirped fiber grating is widened, multiple reflection due to the side lobes of the chirped fiber grating can be prevented. Hence, a wavelength-multiplexed transmission signal multiplexed at a small wavelength interval can be demultiplexed.

In addition, when the chirped fiber grating for which temperature compensation is difficult is combined with the fiber Bragg gratings mounted in temperature compensation packages, an optical demultiplex circuit without any dependency on temperature can be constructed.

Furthermore, when a first optical amplification means for receiving signal light transmitted through the first fiber Bragg grating and amplifying the light and a second optical amplification means for amplifying signal light input to the third port are used, an optical amplifier for multiwavelength multiplex transmission having a sufficient gain can be constructed.

What is claimed is:
1. An optical demultiplex circuit comprising:
   an optical circulator having a first port for receiving an optical signal, a second port for outputting the optical signal input to the first port, and a third port for outputting the optical signal input to the second port;
   first reflection means for selectively reflecting optical signals output from the second port and outputting the optical signals to the second port, said first reflection means having a wide reflection wavelength band and side lobes; and
   second reflection means, inserted between the second port and said first light reflection means, for reflecting, of the optical signals output from the second port, only optical signals in a narrow wavelength band corresponding to the side lobes of said first light reflection means.
2. A circuit according to claim 1, wherein
   said first light reflection means comprises a chirped fiber grating, and
   said second light reflection means comprises at least one fiber Bragg grating.
3. A circuit according to claim 2, wherein
   said fiber Bragg grating is mounted in a temperature compensation package.
4. A circuit according to claim 2, wherein
   said light reflection means comprises a plurality of fiber Bragg gratings cascade-connected and having different reflection wavelengths.
5. A circuit according to claim 1, further comprising
   third light reflection means for reflecting, of the optical signals transmitted through said first light reflection means, only an optical signal having a specific wavelength.
6. A circuit according to claim 1, wherein
   said first and second light reflection means pass optical signals out of the reflection wavelength bands in two directions,
   the optical signals transmitted through said first and second light reflection means are output to a first exit port, and
   the optical signals reflected by said first and second light reflection means are output to a second exit port through the second and third ports of said optical circulator.

7. A circuit according to claim 1, further comprising first optical amplification means for amplifying the optical signals transmitted through said first and second light reflection means, and second optical amplification means for amplifying the optical signal output from the third port.

8. An optical demultiplex circuit comprising:

an optical circulator having a first port for receiving an optical signal, a second port for outputting the optical signal input to the first port, and a third port for outputting the optical signal input to the second port;

a chirped fiber grating for selectively reflecting optical signals output from the second port and outputting the optical signals to the second port, said chirped fiber grating having wide-band reflection wavelength characteristics and side lobes;

first and second fiber Bragg gratings cascade-connected between the second port and said chirped fiber grating to reflect, of the optical signals output from the second port, only optical signals in a wavelength band corresponding to the side lobes of said chirped fiber grating, said first and second fiber Bragg gratings having different reflection wavelengths; and a third fiber Bragg grating for reflecting, of the optical signals transmitted through said chirped fiber grating, only an optical signal with an outer wavelength of the side lobe of said chirped fiber grating.

* * * * *